(12) United States Patent
Jadidian et al.

(10) Patent No.: US 11,914,093 B2
(45) Date of Patent: Feb. 27, 2024

(54) RF ANTENNA SCANNING FOR HUMAN MOVEMENT CLASSIFICATION

(71) Applicant: Microsoft Technology Licensing, LLC, Redmond, WA (US)

(72) Inventors: Jouya Jadidian, Los Gatos, CA (US); Emily Po-Kay Chung, Mountain View, CA (US); James Chester Meador, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 162 days.

(21) Appl. No.: 17/643,141

(22) Filed: Dec. 7, 2021

(65) Prior Publication Data

US 2023/0176243 A1 Jun. 8, 2023

(51) Int. Cl.
  *G01V 3/08* (2006.01)
  *G01V 3/38* (2006.01)
  *G06F 3/01* (2006.01)

(52) U.S. Cl.
  CPC .............. *G01V 3/088* (2013.01); *G01V 3/38* (2013.01); *G06F 3/012* (2013.01)

(58) Field of Classification Search
  CPC .......... G06F 3/012; G06F 3/013; G06F 3/017; G06F 2202/011; G01V 3/088; G01V 3/38
  See application file for complete search history.

(56) References Cited

U.S. PATENT DOCUMENTS

| | | | |
|---|---|---|---|
| 5,012,206 A | 4/1991 | Tigges | |
| 8,964,298 B2 * | 2/2015 | Haddick | G02B 27/017 359/630 |

(Continued)

FOREIGN PATENT DOCUMENTS

| | | | | |
|---|---|---|---|---|
| CN | 109450477 A | * | 3/2019 | ............. H01Q 1/241 |
| CN | 111190489 A | * | 5/2020 | ............. G06F 3/014 |

(Continued)

OTHER PUBLICATIONS

Hughes, et al., "Intelligent RF-Based Gesture Input Devices Implemented Using e-Textiles", In Journal of Sensors, vol. 17, Issue 2, Jan. 24, 2017, 19 Pages.

(Continued)

*Primary Examiner* — Jermele M Hollington
*Assistant Examiner* — Sean Curtis
(74) *Attorney, Agent, or Firm* — Alleman Hall & Tuttle LLP

(57) ABSTRACT

A method for human movement classification includes a plurality of radio frequency (RF) antennas to expose a body surface of a human user to an E-field, at least a part of the human user positioned within a near-field region relative to the RF antennas. The plurality of RF antennas are scanned to determine ground-relative changes in electrical conditions. A differential-scanning subset of RF antennas are selected, including two or more RF antennas for which the changes in electrical conditions exceed a threshold. For each RF antenna in the differential-scanning subset, a set of antenna-relative changes in electrical conditions are determined by comparing the RF antenna to one or more other RF antennas in the differential-scanning subset as a plurality of pairs. Based at least in part on the ground-relative changes in electrical conditions and the antenna-relative changes in electrical conditions, a movement performed by the human user is classified.

17 Claims, 9 Drawing Sheets

(56) References Cited

U.S. PATENT DOCUMENTS

| | | | |
|---|---|---|---|
| 9,507,427 B2* | 11/2016 | Dang | G06F 3/017 |
| 9,639,685 B2 | 5/2017 | Anderson | |
| 9,720,515 B2* | 8/2017 | Wagner | G06N 3/08 |
| 9,817,109 B2* | 11/2017 | Saboo | G06F 3/011 |
| 9,984,528 B2* | 5/2018 | Seitz | G07F 7/10 |
| 10,181,653 B2 | 1/2019 | Trotta et al. | |
| 10,252,145 B2* | 4/2019 | Tran | G06V 40/28 |
| 10,368,378 B2 | 7/2019 | Foster et al. | |
| 10,382,614 B2 | 8/2019 | Novet | |
| 10,419,655 B2* | 9/2019 | Sivan | G06F 3/012 |
| 10,477,355 B1* | 11/2019 | Niranjayan | A61B 5/1113 |
| 10,594,916 B2* | 3/2020 | Sivan | H04W 4/80 |
| 10,732,724 B2* | 8/2020 | Xue | H04W 72/0453 |
| 10,817,065 B1* | 10/2020 | Lien | A63F 13/24 |
| 10,948,996 B2* | 3/2021 | Poupyrev | G01S 13/89 |
| 11,016,574 B2* | 5/2021 | Williams | G01S 13/06 |
| 11,019,246 B2* | 5/2021 | Sivan | G06F 3/013 |
| 11,163,371 B2* | 11/2021 | Poupyrev | G01S 13/72 |
| 11,169,988 B2* | 11/2021 | Poupyrev | G06F 16/242 |
| 11,209,908 B2* | 12/2021 | Mizunuma | G06F 3/014 |
| 11,275,482 B2* | 3/2022 | Osterhout | G06F 3/017 |
| 11,442,550 B2* | 9/2022 | Qiu | G01S 7/417 |
| 11,467,675 B1* | 10/2022 | Hooker | G06F 3/0346 |
| 11,614,345 B2* | 3/2023 | Jadidian | G06F 3/012 |
| | | | 324/686 |
| 11,630,521 B2* | 4/2023 | Lee | G06F 3/017 |
| | | | 345/156 |
| 11,698,438 B2* | 7/2023 | Lien | G01S 13/66 |
| | | | 345/156 |
| 11,698,439 B2* | 7/2023 | Lien | G06F 21/6245 |
| | | | 345/156 |
| 11,720,168 B1* | 8/2023 | Jadidian | A61B 5/6803 |
| | | | 345/156 |
| 11,775,057 B1* | 10/2023 | Jadidian | G06F 21/32 |
| | | | 345/8 |
| 2009/0219039 A1 | 9/2009 | Fasshauer | |
| 2011/0248773 A1* | 10/2011 | Poupyrev | G01R 27/02 |
| | | | 327/517 |
| 2013/0127980 A1* | 5/2013 | Haddick | G06F 3/013 |
| | | | 348/14.08 |
| 2014/0198029 A1* | 7/2014 | Dang | G06F 3/0346 |
| | | | 345/156 |
| 2016/0036996 A1* | 2/2016 | Midholt | H04B 1/3833 |
| | | | 455/567 |
| 2016/0217645 A1* | 7/2016 | Seitz | G06K 7/10465 |
| 2016/0313801 A1* | 10/2016 | Wagner | G06F 1/163 |
| 2017/0131395 A1* | 5/2017 | Reynolds | G01S 13/56 |
| 2018/0001184 A1* | 1/2018 | Tran | G16H 50/20 |
| 2018/0004298 A1* | 1/2018 | Liu | H03K 17/9542 |
| 2018/0239438 A1* | 8/2018 | Xue | G06F 3/017 |
| 2018/0253151 A1* | 9/2018 | Kletsov | A61B 5/004 |
| 2018/0299953 A1* | 10/2018 | Selker | G06F 3/011 |
| 2019/0182415 A1* | 6/2019 | Sivan | G06F 3/013 |
| 2019/0212821 A1* | 7/2019 | Keller | G06F 3/0426 |
| 2019/0212822 A1* | 7/2019 | Keller | G06F 3/0426 |
| 2019/0212824 A1* | 7/2019 | Keller | G06F 3/016 |
| 2019/0227667 A1* | 7/2019 | Harrison | G06F 3/046 |
| 2019/0387152 A1* | 12/2019 | Sivan | G06F 3/012 |
| 2020/0133398 A1* | 4/2020 | Williams | G06F 3/017 |
| 2020/0170514 A1* | 6/2020 | Hui | A61B 5/0507 |
| 2020/0195833 A1* | 6/2020 | Sivan | G06F 3/013 |
| 2020/0382717 A1* | 12/2020 | Chiu | H04N 23/667 |
| 2021/0072833 A1 | 3/2021 | Mutlu et al. | |
| 2021/0173480 A1* | 6/2021 | Osterhout | G06F 3/04815 |
| 2022/0244787 A1* | 8/2022 | Lee | G01S 5/14 |
| 2022/0350413 A1* | 11/2022 | Hooker | G06F 3/015 |
| 2022/0404175 A1* | 12/2022 | Jadidian | G06F 3/017 |
| 2023/0077010 A1* | 3/2023 | Zhang | G06V 40/171 |
| 2023/0162531 A1* | 5/2023 | Jadidian | G06F 3/013 |
| | | | 382/159 |
| 2023/0176243 A1* | 6/2023 | Jadidian | G01V 3/38 |
| | | | 324/702 |

FOREIGN PATENT DOCUMENTS

| | | | | |
|---|---|---|---|---|
| CN | 112367910 A | * | 2/2021 | A41D 1/002 |
| CN | 112689812 A | * | 4/2021 | |
| EP | 0998659 A1 | | 5/2000 | |
| EP | 3293953 A1 | * | 3/2018 | G01B 7/14 |
| EP | 3289430 B1 | * | 10/2019 | G06F 1/163 |
| EP | 3577544 A1 | | 12/2019 | |
| EP | 4013074 A1 | * | 6/2022 | |
| KR | 20230030472 A | * | 3/2023 | |
| WO | WO-2013049248 A2 | * | 4/2013 | G02B 27/0093 |
| WO | WO-2016174659 A1 | * | 11/2016 | G06F 1/163 |
| WO | WO-2017184274 A1 | * | 10/2017 | G02B 27/0093 |
| WO | WO-2018131251 A1 | * | 7/2018 | G06F 3/014 |
| WO | WO-2018159949 A1 | * | 9/2018 | A61B 5/004 |
| WO | WO-2018232414 A1 | * | 12/2018 | A61B 5/0015 |
| WO | 2020093278 A1 | | 5/2020 | |
| WO | WO-2020093278 A1 | * | 5/2020 | |
| WO | WO-2021231900 A1 | * | 11/2021 | |
| WO | WO-2022026623 A1 | * | 2/2022 | A61B 5/05 |

OTHER PUBLICATIONS

"International Search Report and Written Opinion Issued in PCT Application No. PCT/US22/028879", dated Aug. 9, 2022, 14 Pages.

"International Search Report and Written Opinion Issued in PCT Application No. PCT/US22/042579", dated Dec. 8, 2022, 17 Pages.

* cited by examiner

RF ANTENNA SCANNING FOR HUMAN MOVEMENT CLASSIFICATION

BACKGROUND

Some computing devices have wearable form factors, allowing them to be worn on a human user's body—e.g., as a head-mounted display (HMD) or wrist-worn device. In some cases, a computing device may be programmed to detect and respond to movements of a human user, such as hand gestures and/or facial expressions.

DETAILED DESCRIPTION

Figure 1:
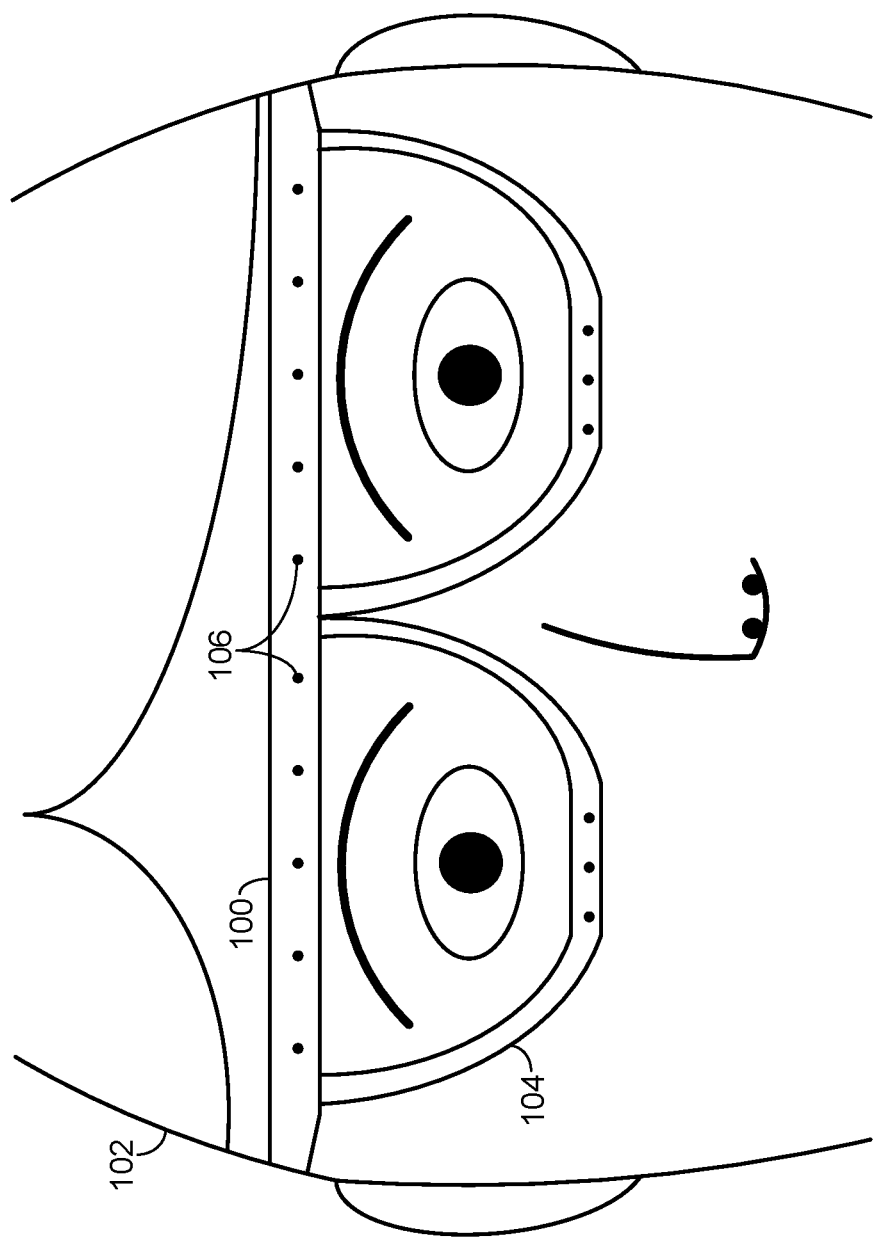
FIG. 1 schematically depicts an example computing device worn by a human user.

A computing device may detect movement of a human user in various ways. In some examples, a computing device may include or interface with one or more radio frequency (RF) antennas configured to expose a body surface of a human user to an E-field—e.g., by driving the RF antennas with a drive signal. The computing device may obtain information regarding the position and/or movements of the user by detecting a change in electrical conditions consistent with proximity of the user to an RF antenna, as a non-limiting example. This may beneficially enable movement detection and classification without depending on ambient or artificial lighting, and without depending on specific skin tones or skeletal structures.

However, given the wide variety of different movements that a user can make (e.g., specific hand gestures, facial expressions), it can be challenging to accurately correlate a detected movement to a specific predefined movement that serves as an input to the computing device. For example, distinguishing between similar movements (e.g., a smile vs a frown) can require data collected from a relatively large number of individual RF antennas. Furthermore, relatively large components (e.g., integrated circuits) may be required to reduce loss and increase quality factor (Q-factor) and dynamic range. This will tend to undesirably increase the power consumption and space requirements associated with the RF-sensing componentry, where both power consumption and space requirements would beneficially be relatively low for a mobile device.

Accordingly, the present disclosure is directed to techniques for classifying a human movement as one of a plurality of predefined human movements, via a plurality of RF antennas that expose a body surface of a human user to an E-field, where at least a part of the human user is positioned in a near-field region relative to the plurality of RF antennas. Specifically, the RF antennas are scanned to determine ground-relative changes in electrical conditions at each antenna, as compared to a previous time frame, where such changes may be caused by movement of a part of the human user in relatively close proximity to the antenna. One or more antennas for which the ground-relative changes in electrical conditions exceed a threshold are selected for inclusion in a differential-scanning subset of RF antennas, which are then differentially scanned as a plurality of pairs to determine sets of antenna-relative changes in electrical conditions for each RF antenna in the subset. The movement of the human user may then be classified based at least in part on both the ground-relative and the antenna-relative changes in electrical conditions determined for the RF antennas.

Accordingly, the techniques described herein may beneficially enable a larger number of measurements to be obtained for each individual RF antenna, which can provide relatively more information about the movement of the human user, without requiring provision of additional RF antennas. This in turn enables more accurate detection and classification of human movements, while reducing the overall power consumption and physical footprint of the sensing componentry.

FIG. 1 schematically shows an example computing device 100 that may implement the techniques described herein. In this example, the computing device takes the form of a head-mounted display (HMD) 100 being worn on the face of a human user 102. HMD 100 includes a near-eye display 104, which may be useable to present computer-generated imagery (e.g., augmented and/or virtual reality content) to one or both eyes of the human user. It will be understood, however, that a "computing device" as described herein may have any suitable capabilities, form factor, and hardware configuration, provided that it includes or interfaces with RF antennas positioned in sense-enabling proximity to a human user. As another example, as will be described in more detail below, a computing device may be wearable on a human user's hand or wrist. In some examples, a computing device as described herein may be implemented as computing system 1000 described below with respect to FIG. 10.

As shown in FIG. 1, computing device 100 includes a plurality of RF antennas 106, represented by black circles disposed along the housing of computing device 100. It will be understood that this is done for the sake of illustration only—in practical examples, a computing device may include and/or interface with any suitable number of RF antennas. The plurality of RF antennas may each have any suitable positions relative to one another, the computing device, and the human user. For example, rather than integrated within a housing of the computing device as is shown in FIG. 1, the plurality of RF antennas may be physically separate from the computing device that classifies the human movement. For example, the RF antennas may be integrated into a wearable accessory that communicates with a separate computing device. Furthermore, the RF antennas may have any suitable appearance, and may or may not be visible to the human user and/or an outside observer.

As will be described in more detail below, any or all of the plurality of RF antennas may be driven to influence electrical conditions in the vicinity of a human user. Each individual RF antenna may in some cases expose a different part of the human user's body surface to an E-field. For example, one or more RF antennas may generate an E-field in the vicinity of the user's eyes, while one or more other RF antennas generate an E-field in the vicinity of the nose, and so on to achieve a desired coverage of the user's face. This may enable the computing device to detect movements of the user's face, and classify such movements as predefined movements that serve as inputs to the computing device—e.g., different facial expressions.

For example, as human skin is conductive, proximity of the conductive human skin in a near-field region relative to the plurality of RF antennas man disturb an E-field generated by driving the plurality of RF antennas with drive signals, thereby influencing characteristics of the circuitry at one or more of the plurality of RF antennas. In particular, movement of conductive skin near an RF antenna (e.g., caused by movement of muscles under the skin) may affect the impedance at the RF antenna in a measurable way. This change in electrical conditions at the RF antenna may be useable to derive information relating to the user's movement. The user's movement may then be classified as one or more predefined human movements (e.g., recognizable gestures or facial expressions) by aggregating and interpreting data collected by the plurality of RF antennas.

Figure 2:
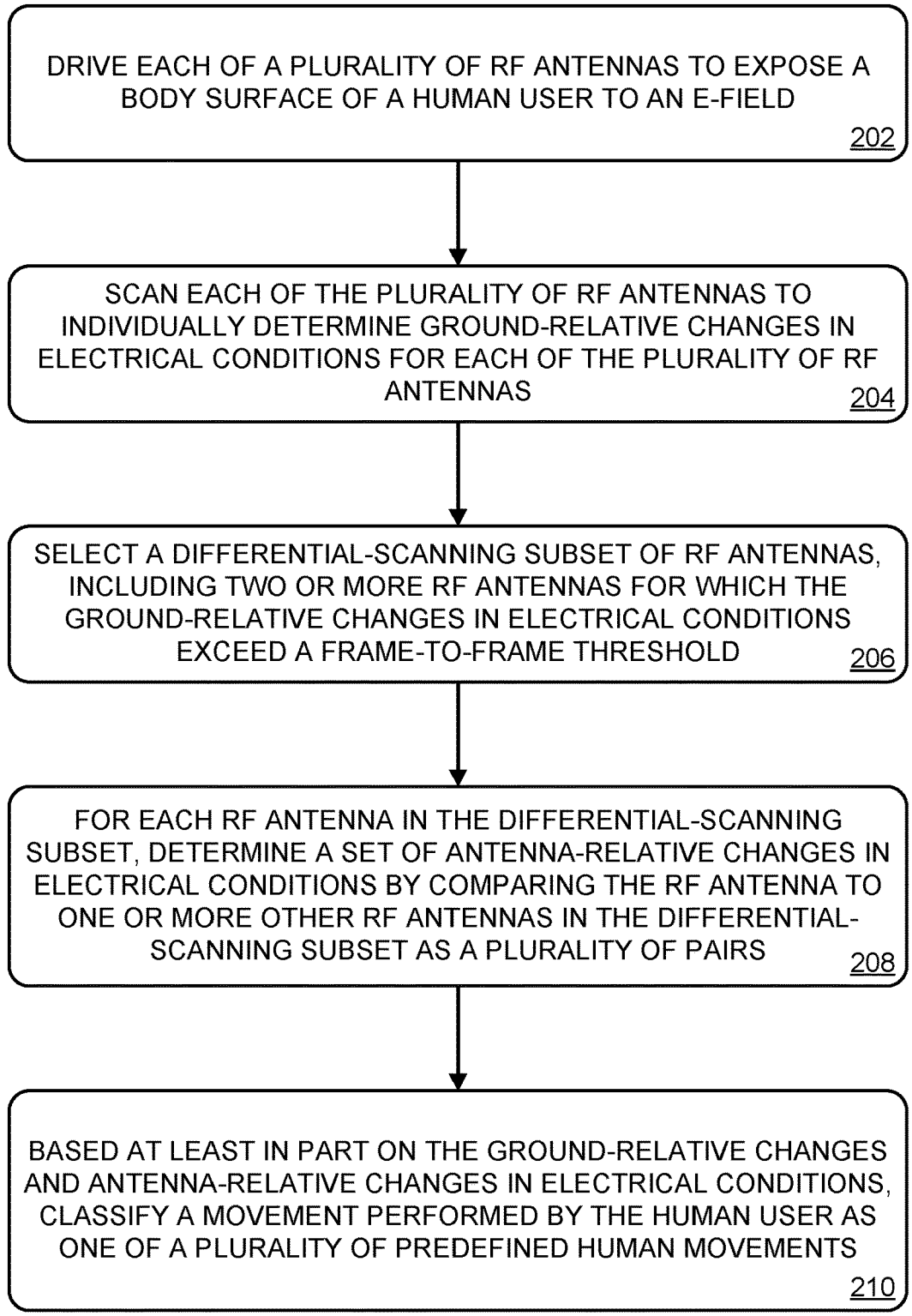
FIG. 2 illustrates an example method for human movement classification.

To this end, FIG. 2 illustrates an example method 200 for human movement classification. Method 200 may be implemented by any suitable computing system of one or more computing devices—e.g., computing device 100 of FIG. 1. Any computing device(s) implementing method 200 may have any suitable capabilities, hardware configuration, and form factor. In some examples, method 200 may be implemented by computing system 1000 described below with respect to FIG. 10.

At 202, method 200 includes, at a computing device, driving each of a plurality of RF antennas to expose a body surface a human user to an E-field. At least part of the human user may be positioned within a near-field region relative to the plurality of RF antennas. As discussed above, presence of conductive human skin in a near-field region relative to any particular RF antenna may affect electrical conditions (e.g., impedance) at that RF antenna. Thus, a change in the distance between the conductive human skin and the RF antenna may result in a change in the electrical conditions at the antenna—e.g., detectable as a change in voltage. In this manner, detected changes in electrical conditions at the plurality of RF antennas from one time frame to another may be used to evaluate movements of the human user between the two time frames. In particular, movement of the human user may change characteristics of a circuit that the user is also part of. Specifically, the system may be described as an oscillator having a resonant frequency that is sensitive to changes in parasitic capacitance. In other words, the change in frequency of the oscillator may be caused by a change in capacitive loading at the user's body surface, and this may be affected by movements of the user.

Figure 3A:
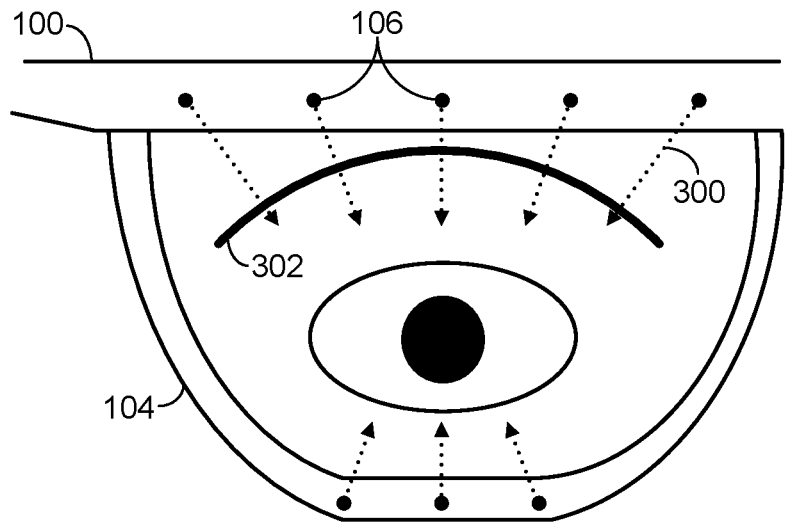
FIGS. 3A and 3B schematically illustrate radio frequency (RF) antennas exposing a human face surface to an E-field.
Figure 3B:
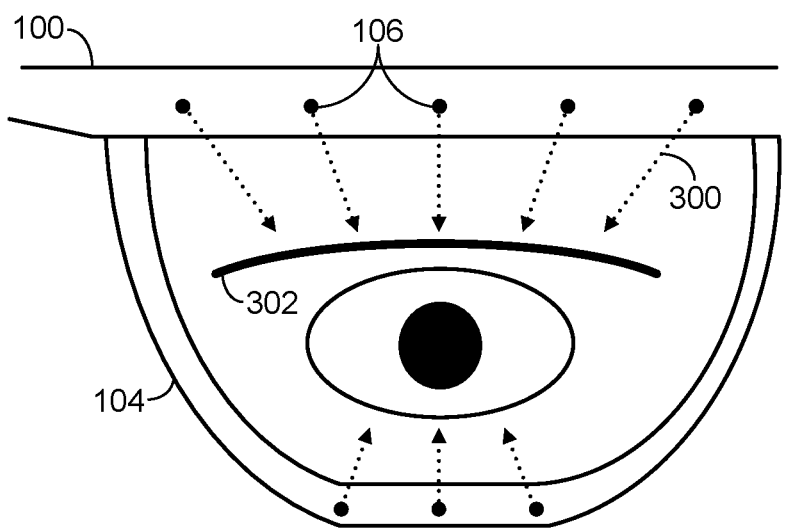

This is schematically illustrated with respect to FIGS. 3A and 3B. Specifically, FIG. 3A shows a portion of computing device 100 worn on the face of human user 102. In FIG. 3A, each of the plurality of RF antennas 106 are driven to generate an E-field 300 in the vicinity of the human user. This may be done by driving the plurality of RF antennas to emit electromagnetic radiation having any suitable wavelength, amplitude, and/or other suitable characteristics.

FIG. 3B schematically depicts the plurality of RF antennas continuing to expose the surface of the face of the human user to the E-field on a subsequent time frame. In other words, FIG. 3B depicts a moment in time that occurs after FIG. 3A. During the intervening time between FIGS. 3A and 3B, the user's facial expression has changed. Specifically, the user's eyebrow 302 has lowered relative to the user's eye and near-eye display 104 of computing device 100. This movement of the human user (e.g., movements of muscles in the user's face) may influence electrical conditions at one or more of the plurality of RF antennas, as discussed above.

Figure 4A:
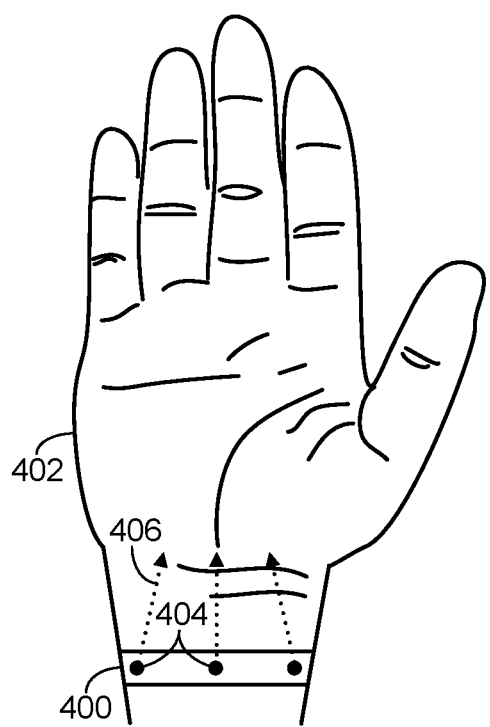
FIGS. 4A and 4B schematically illustrate RF antennas exposing a human hand surface to an E-field.
Figure 4B:
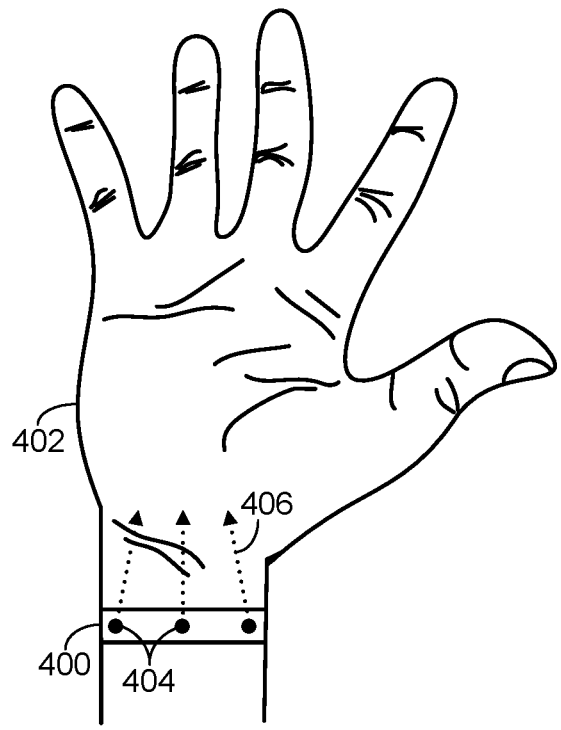

Though the present disclosure primarily focuses on computing devices worn on or near a user's face (e.g., as an HMD), it will be understood that this is not limiting. FIGS. 4A and 4B schematically illustrate another example computing device 400 that may implement any or all of the techniques described herein. Specifically, computing device 400 is a mobile device that is worn on the wrist of a human hand 402. Computing device 400 may, for example, take the form of a smartwatch, or other computing device having a wrist-wearable form factor.

As with computing device 100, computing device 400 includes a plurality of RF antennas 404 configured to expose the human user body surface to an E-field 406. In this example, the hand surface of the human user is exposed to the E-field, at least part of which is positioned within a near-field region relative to the RF antennas. Furthermore, in this example, the gesture formed by human hand 402 changes between FIG. 4A and FIG. 4B. Specifically, between FIGS. 4A and 4B, the hand forms a gesture in which the fingers and thumb are spread apart from one another. This is associated with muscular movements in the user's hand and wrist, which may cause a change in electrical conditions (e.g., a detectable change in voltage) at any or all of the plurality of RF antennas 404, as discussed above. Thus, by collecting data from each of the plurality of RF antennas, the computing device may classify the detected movement of the human hand, as will be described in more detail below.

Figure 5:
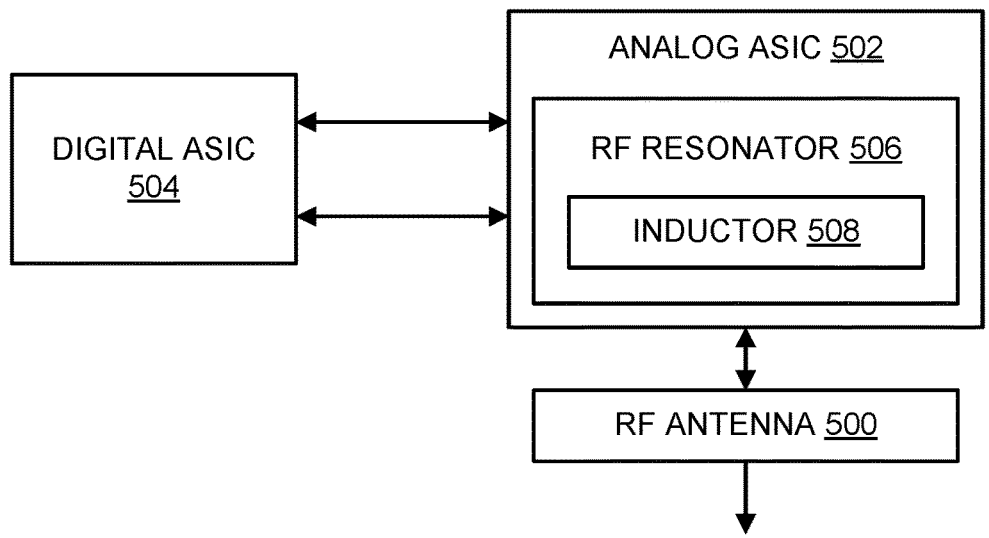
FIG. 5 schematically depicts example components associated with an RF antenna.

Regardless of the specific form factor used by the computing device, each of the plurality of RF antennas may be implemented in any suitable way, provided they are useable to expose a part of a human user positioned in a near-field region to an E-field. FIG. 5 schematically illustrates example electronic componentry that may be useable to implement and control a plurality of RF antennas, as described herein.

Specifically, in the example of FIG. 5 example, at least one RF antenna 500 is communicatively coupled with an application-specific integrated circuit (ASIC) 502, which may be implemented in any suitable way. As one non-limiting example, ASIC 502 may be an analog ASIC implemented via a BCD (bipolar-CMOS (complementary metal oxide semiconductor)-DMOS (double diffused metal oxide semiconductor)) process. BCD technology is beneficially more accessible in larger process nodes, while supporting relatively higher voltages associated with a higher Q-factor.

The overall power consumption and physical footprint of the logical elements may further be reduced by splitting the ASIC into two separate packages. In the example of FIG. 5, the analog ASIC is communicatively coupled with a digital ASIC 504, which may use a relatively smaller process for digital blocks, while the analog ASIC is relatively larger to accommodate analog pins for a plurality of RF sensing channels. For example, the digital ASIC may use a CMOS process, while the analog ASIC uses a BCD process. It will be understood, however, that ASICs 502 and 504 depicted in FIG. 5 are non-limiting examples, and that the techniques described herein may be implemented using any suitable combination of logical elements.

Furthermore, the logical elements may use any suitable combination of hardware to drive and scan one or more RF antennas. For example, in FIG. 5, at least one RF antenna 500 is communicatively coupled with an RF resonator 506 and an inductor 508. These elements in combination may be useable to generate drive signals that, when supplied to RF antennas, cause the RF antennas to generate an E-field. It will be understood that the RF resonator and inductor may each take any suitable form, and that the specific arrangement of components depicted in FIG. 5 is non-limiting. For instance, in some examples, multiple RF resonators and/or inductors may be used to drive the plurality of RF antennas, even though only one RF resonator and inductor is shown in FIG. 5.

Figure 6:
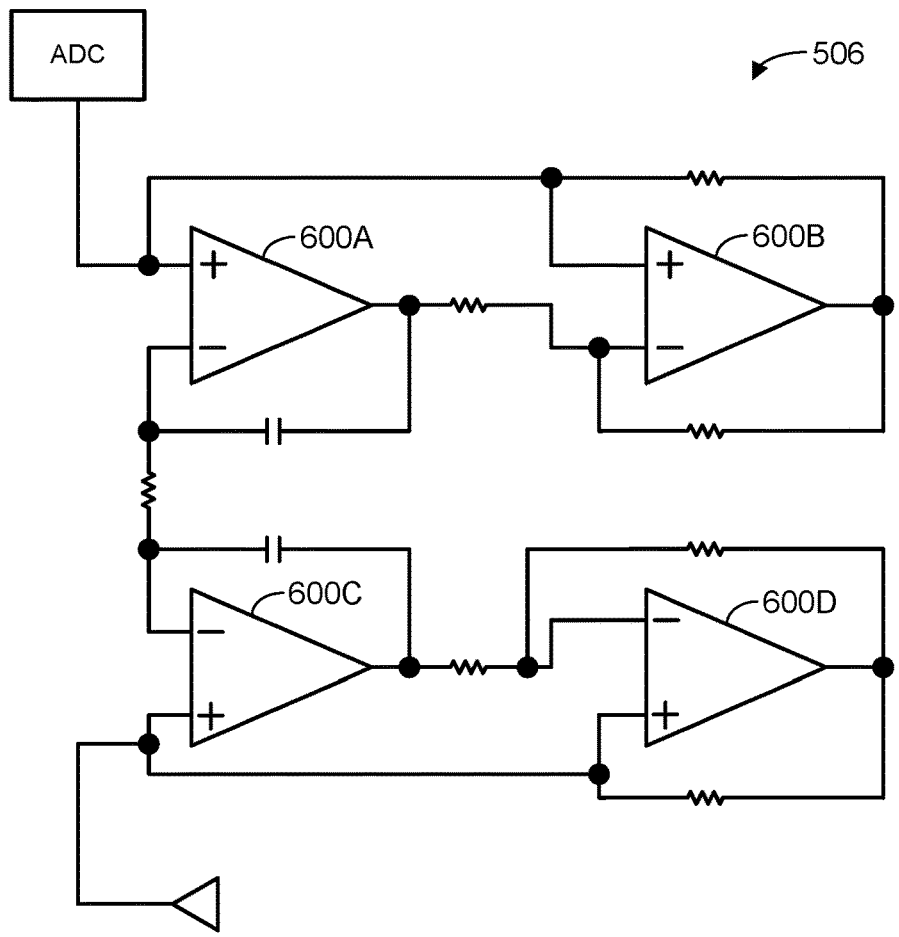
FIG. 6 shows an example circuit diagram for an inductor useable with the components of FIG. 5.

Furthermore, in some examples, the inductor may be a synthetic inductor comprising a plurality of operational amplifiers (op-amps) arranged in a cascaded topology. One example circuit diagram for a suitable synthetic inductor is shown in FIG. 6, including a plurality of op-amps 600A-600D arranged in a cascaded topology. This may enable the circuit to support relatively high inductance values, while reducing loss and increasing Q-factor. The specific circuit design shown in FIG. 6 may beneficially enable the dynamic range and power consumption of the RF-sensing componentry to be controlled on the fly. It will be understood, however, that the circuit diagram of FIG. 6 is only one non-limiting example, and that an inductor may be implemented in any suitable way.

Returning briefly to FIG. 2, at 204, method 200 includes scanning each of the plurality of RF antennas to individually determine ground-relative changes in electrical conditions for each of the plurality of RF antennas relative to a previous time frame. In other words, on each of a series of time frames, the computing device may determine whether electrical conditions at any given RF antenna have changed relative to the preceding time frame. For example, a change in electrical conditions detected at a particular RF antenna of the plurality of RF antennas may be caused by a change in a distance between the particular RF antenna and the human user while the body surface of the human user is exposed to the E-field. This may occur when at least a part of the human user is positioned within a near-field region relative to any particular RF antenna, as discussed above.

Figure 7:
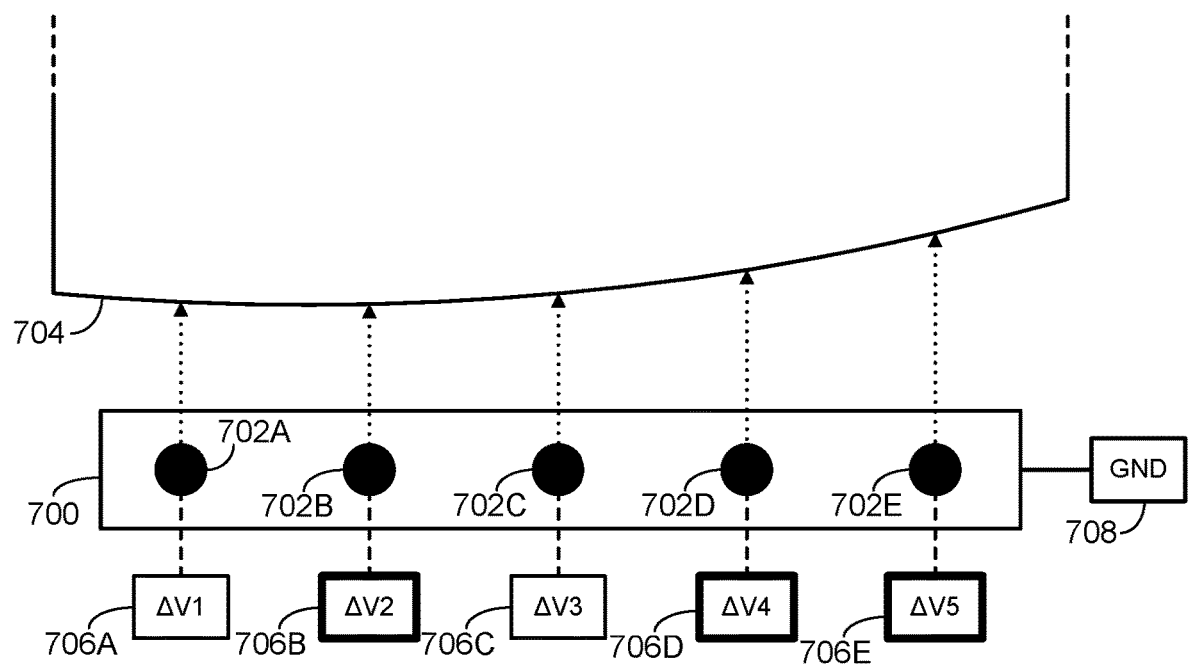
FIG. 7 schematically illustrates scanning a plurality of RF antennas to determine ground-relative changes in electrical conditions.

This is schematically illustrated with respect to FIG. 7, which shows an example computing device 700 that includes a plurality of RF antennas 702A-702E. Each of the plurality of RF antennas is exposing a part of a human user 704 to an E-field, which generically represents any suitable part of a human user's body (e.g., the user's face or hand as described above). The computing device measures changes in electrical conditions 706A-706E for each of the plurality of RF antennas, relative to a previous time frame. In this example, the changes in electrical conditions are expressed as measured changes in voltage (ΔV) relative to a previous time frame. However, it will be understood that a change in electrical conditions may be expressed in any suitable way—e.g., as a change in current, amplitude, and/or signal phase.

The changes in electrical conditions are primarily described herein as being relative to a previous time frame. It will be understood that any suitable fixed or variable framerate may be used, and that the actual length of time between any two time frames may have any suitable value. As non-limiting examples, the framerate may be 1 Hz, 15 Hz, 30 Hz, 60 Hz, etc. Furthermore, the framerate at which the plurality of RF antennas are scanned to determine ground-relative changes in electrical conditions may be independent from a framerate at which virtual imagery is displayed, and/or framerates at which any other computer operations are performed by the computing device.

Furthermore, the electrical conditions (e.g., voltage) at each RF antenna may be measured relative to any suitable baseline. In the example of FIG. 7, the changes in electrical conditions are ground-relative changes in electrical conditions, which include detected changes in voltage at each of the plurality of RF antennas relative to an electrical ground 708 of the computing device—e.g., the device chassis. In other examples, however, the electrical conditions at each RF antenna may be compared to any suitable common reference.

Furthermore, the drive signals applied to the plurality of RF antennas to generate the E-field may have any suitable characteristics. As the changes in electrical conditions for each of the plurality of RF antennas are compared to a common reference (e.g., changes in voltage relative to the computing device ground), the plurality of RF antennas may each be driven to generate the E-field using drive signals having a same voltage and phase. In FIG. 7, this is indicated by the same solid black fill pattern being applied to each of the circles representing the plurality of RF antennas 702A-702E. In other examples, however, drive signals having different voltage and/or phase may be applied to two or more of the plurality of RF antennas in determining ground-relative changes in electrical conditions.

It will be understood that the specific frequencies used to drive the RF antennas, and the electrical characteristics of the larger circuit as a whole, may be tuned to achieve a desired level of sensitivity and power draw. Specifically, an RF antenna exposing conductive human skin positioned within a near field region relative to the RF antenna to an E-field may cause capacitive loading of the human skin. This may result in flow of complex or real current between the RF antenna and human user depending on the specific circuit design, the frequency of the drive signal, and the proximity of the human skin.

Operation of the system may be characterized by different signal response curves corresponding to capacitive, inductive, and resonance modes for any particular RF antenna. The behavior of the system may transition between each of these signal response curves depending on the current amount of capacitance between the RF antenna and the human skin, influenced by the proximity of the human user to the RF antenna. The slope of each signal response curve is based at least in part on the Q-factor, where a higher Q-factor results in a steeper curve, and therefore a greater signal response for a particular change in capacitance. The circuit may beneficially be tuned such that each RF antenna primarily operates in the capacitive mode, which is characterized by relatively low power draw as compared to the resonance and inductive modes. However, as the distance between the RF antenna and human skin changes, a relatively large change in signal may be observed as the circuit transitions from the capacitive curve to the resonance curve, enabling the movement of the human user to be detected with a relatively high confidence.

Determining ground-relative changes in electrical conditions for each of the plurality of RF antennas as discussed above will typically provide one measurement per antenna. However, unless a large number of RF antennas are provided (thereby increasing the power draw and physical space footprint of the computing device), one measurement per antenna may be insufficient for accurately distinguishing between different types of human movements. Thus, determining ground-relative changes in electrical conditions may be useful in rapidly determining that movement has occurred in close proximity to one or more RF antennas, although may be relatively less useful in evaluating the nature of such movement—e.g., determining what facial expression the user is making.

Accordingly, returning briefly to FIG. 2, at 206, method 200 includes selecting a differential-scanning subset of RF antennas from among the plurality of RF antennas. Specifically, the selected antennas include two or more RF antennas for which the ground-relative changes in electrical conditions exceed a frame-to-frame threshold. In other words, the computing device identifies two or more RF antennas that exhibited relatively larger changes in electrical conditions from one frame to the next, indicative of one or more parts of the human user moving in relatively close proximity to those antennas. Thus, the differential-scanning subset may exclude any RF antennas for which the observed changes in electrical conditions were relatively low, or zero, indicating that such RF antennas correspond to parts of the human user that exhibited little if any movement.

This is also schematically illustrated with respect to FIG. 7. As shown, electrical changes 706B, 706D, and 706E are represented with darker borders, indicating that those changes in electrical conditions exceeded frame-to-frame thresholds, and the corresponding RF antennas 702B, 702D, and 702E were therefore selected for inclusion in the differential-scanning subset. By contrast, the changes in electrical conditions observed for RF antennas 702A and 702C did not exceed frame-to-frame thresholds, and therefore were not selected for the differential-scanning subset. As discussed above, this may indicate, for example, that RF antennas 702A and/or 702C correspond to portions of the human user that exhibited little to no movement from one frame to the next.

In some examples, a single frame-to-frame threshold may be used in selecting RF antennas for inclusion in the differential-scanning subset. In other words, electrical changes detected at each antenna may be compared to the same frame-to-frame threshold, and if the threshold is exceeded, that RF antenna is selected for the differential-scanning subset. In other examples, one or more RF antennas of the plurality of RF antennas may be associated with different antenna-specific frame-to-frame thresholds for inclusion in the differential-scanning subset. For example, each individual RF antenna may be associated with its own specific frame-to-frame threshold, to which the changes in electrical conditions detected for that antenna are compared in determining whether the antenna should be included in the differential-scanning subset. This may, for instance, allow the different frame-to-frame thresholds for each RF antenna to be customized based on the normal range of motion of the specific part of the human body that the RF antenna is directed toward.

As discussed above, the computing device may scan the plurality of RF antennas to determine ground-relative changes in electrical conditions at a variable framerate. This framerate may in some examples be dynamically changed based at least in part on a number of RF antennas selected for inclusion in the differential-scanning subset. For example, scanning each of the plurality of RF antennas to determine ground-relative changes in electrical conditions may be done relatively quickly, as only one measurement is taken for each antenna. By contrast, differentially-scanning RF antennas as a plurality of pairs takes longer, although may provide more information about a detected movement of a human user. Thus, the framerate may be relatively lower when the number of RF antennas selected for inclusion in the differential-scanning subset is relatively higher. In some cases where a relatively large number of RF antennas exceed the frame-to-frame threshold, the computing device may decrease the framerate to a minimum acceptable framerate, then begin capping the number of RF antennas selected for inclusion in the differential-scanning subset, rather than decreasing the framerate further.

Returning briefly to FIG. 2, at 208, method 200 includes, for each RF antenna in the differential-scanning subset, determining a set of antenna-relative changes in electrical conditions by comparing the RF antenna to one or more other RF antennas in the differential-scanning subset as a plurality of pairs. In other words, antenna-relative changes in electrical conditions detected at each antenna of the subset are determined by comparing that antenna to one or more other antennas, rather than to the electrical ground of the computing device. For example, the set of antenna-relative changes in electrical conditions for each RF antenna of the subset may correspond to differences in measured voltage between the RF antenna and the one or more other RF antennas of the differential-scanning subset.

This is schematically illustrated with respect to FIGS. 8A and 8B, which again show computing device 700 including RF antennas 702A-702E. As discussed above, RF antennas 702B, 702D, and 702E were selected for inclusion in the differential-scanning subset. These RF antennas are then differentially scanned as a plurality of pairs to determine sets of antenna-relative changes in electrical conditions for each RF antenna in the subset.

Figure 8A:
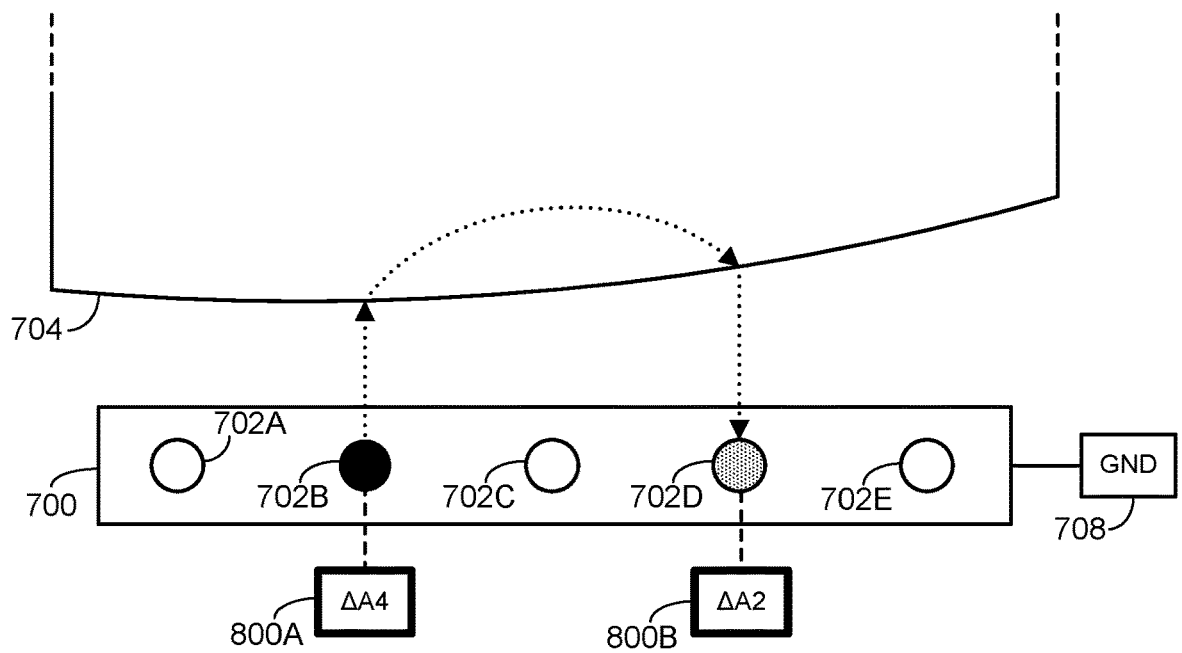
FIGS. 8A and 8B schematically illustrate scanning a differential-scanning subset of RF antennas to determine antenna-relative changes in electrical conditions.
Figure 8B:
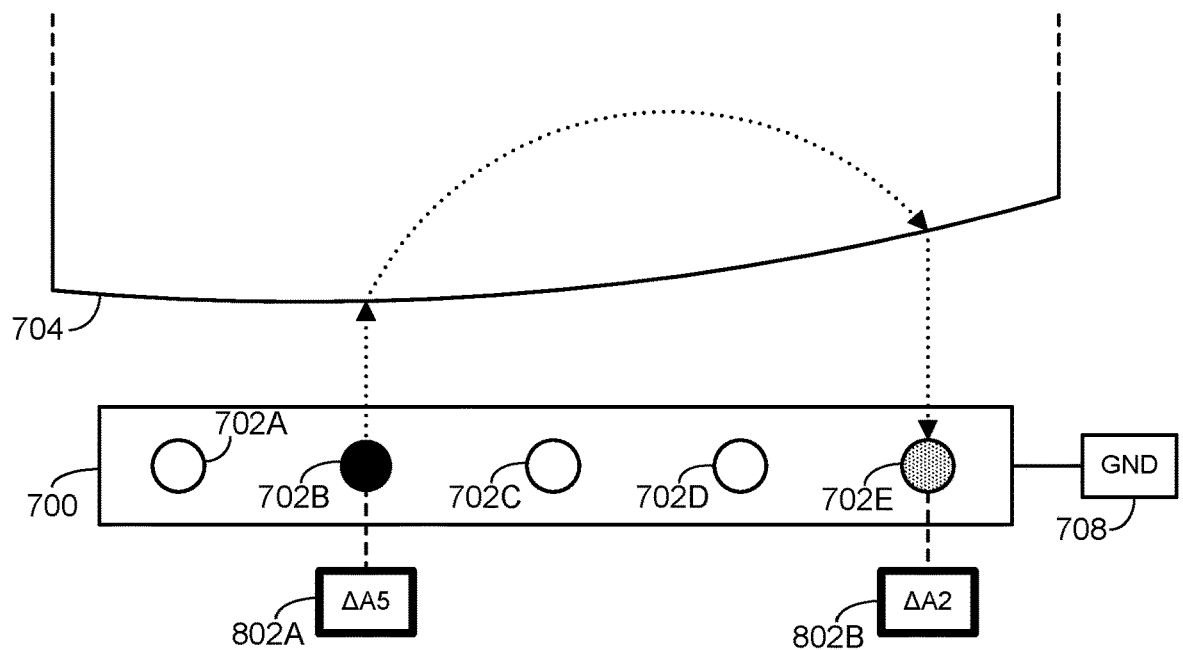

Specifically, FIG. 8A schematically illustrates determining antenna-relative changes in electrical conditions between a first pair of antennas of the subset—in this example, RF antennas 702B and 702D. This may be done in various suitable ways. In one example, determining a set of antenna-relative changes in electrical conditions for any pair of RF antennas in the differential scanning subset includes driving a first RF antenna of the pair with a first drive signal, and driving a second RF antenna of the pair with a second drive signal having a same voltage as the first drive signal and having an opposite phase from the first drive signal.

This is the case in FIG. 8A, in which RF antenna 702B is driven with a first drive signal, as indicated by the solid black fill used for the circle representing the antenna. RF antenna 702D is driven with a second drive signal, having the same voltage and an opposite phase from the first drive signal, as indicated by the shaded fill pattern used for the circle representing the antenna. This has the effect of driving complex or real current between the two antennas and through at least a part of the human user—e.g., current may be conducted through layers of skin, fat, muscle, blood, and/or other tissues. In the example of FIG. 8A, the other RF electrodes are not driven at this time, as indicated by the solid white fill used for the circles representing RF antennas 702A, 702C, and 702E.

It will be understood that the specific drive signals applied to the pairs of RF antennas during differential scanning may take any suitable form. In other words, the specific approach described above in which pairs of electrodes are driven with drive signals having the same voltage but opposite phase is only one non-limiting example.

Movement of the human user may affect the conductivity between the two RF antennas—e.g., due to movement of muscles beneath the user's skin—and this may affect the voltage detected at each RF antenna. Thus, the specific values for the antenna-relative changes in electrical conditions 800A and 800B, corresponding to RF electrodes 702B and 702D, will change depending on the specific conductive path formed by the drive signals applied to the two antennas. In this manner, determining antenna-relative changes in electrical conditions can provide more information regarding the movement of a human user than only determining ground-level changes in electrical conditions, as discussed above.

Furthermore, the RF antennas of the differential-scanning subset are compared as a plurality of pairs. Thus, in FIG. 8B, antenna-relative changes in electrical conditions are determined for a second pair of RF antennas—antennas 702B and 702E. Again, a first RF antenna of the pair (antenna 702B) is driven with a first drive signal, while the second RF antenna of the pair (antenna 702E) is driven with a second drive signal. This has the effect of forming a different conductive path between the two RF antennas, again flowing through at least a part of the human user, meaning the antenna-relative changes in electrical conditions 802A and 802B determined for the pair of electrodes will be influenced by any movements of the human user.

It will be understood that this process may be repeated until each potential pair of RF antennas in the differential-scanning subset have been compared, resulting in sets of antenna-relative changes for each RF antenna in the subset. For instance, between FIGS. 8A and 8B, two different antenna-relative changes in electrical conditions have been determined for RF antenna 702B, by comparing it to RF antennas 702D and 702E. Sets of antenna-relative changes in electrical conditions may further be determined for RF electrodes 702D, 702E, and any other RF antennas selected for inclusion in the differential-scanning subset. For instance, RF antennas 702D and 702E may be paired together to determine antenna-relative changes in electrical conditions between the two RF antennas. In general, for a differential-scanning subset of RF antennas including n total antennas, the number of total measurements m obtained through differential-scanning may be equal to:

$$m = \frac{n*(n-1)}{2}$$

In other examples, however, the computing device may refrain from comparing every potential pair of RF antennas in the differential-scanning subset. For example, the computing device may refrain from comparing an RF antenna to any other RF antennas within a threshold distance. This is because the conductive path between two nearby antennas would likely flow through a relatively small portion of the human user, and would therefore provide relatively less information about the movement of the human user than would be the case for more distant RF antennas. In other words, the one or more other RF antennas compared to any particular RF antenna in the differential-scanning subset for determining the set of antenna-relative changes in electrical conditions for the particular RF antenna may exclude any RF antennas in the differential-scanning subset that are closer than a threshold distance to the particular RF antenna. Thus, for example, the computing device may refrain from comparing RF antennas 702D and 702E, if these antennas are closer than a threshold distance. It will be understood that any suitable distance threshold may be used, depending on the implementation.

Regardless, however, it will be understood that the computing device determines some number of antenna-relative changes in electrical conditions for one or more RF antennas of the differential-scanning subset. Returning briefly to FIG. 2, at 210, method 200 includes, based at least in part on the ground-relative changes in electrical conditions and the antenna-relative changes in electrical conditions, classifying a movement performed by the human user as one of a plurality of predefined human movements.

Figure 9:
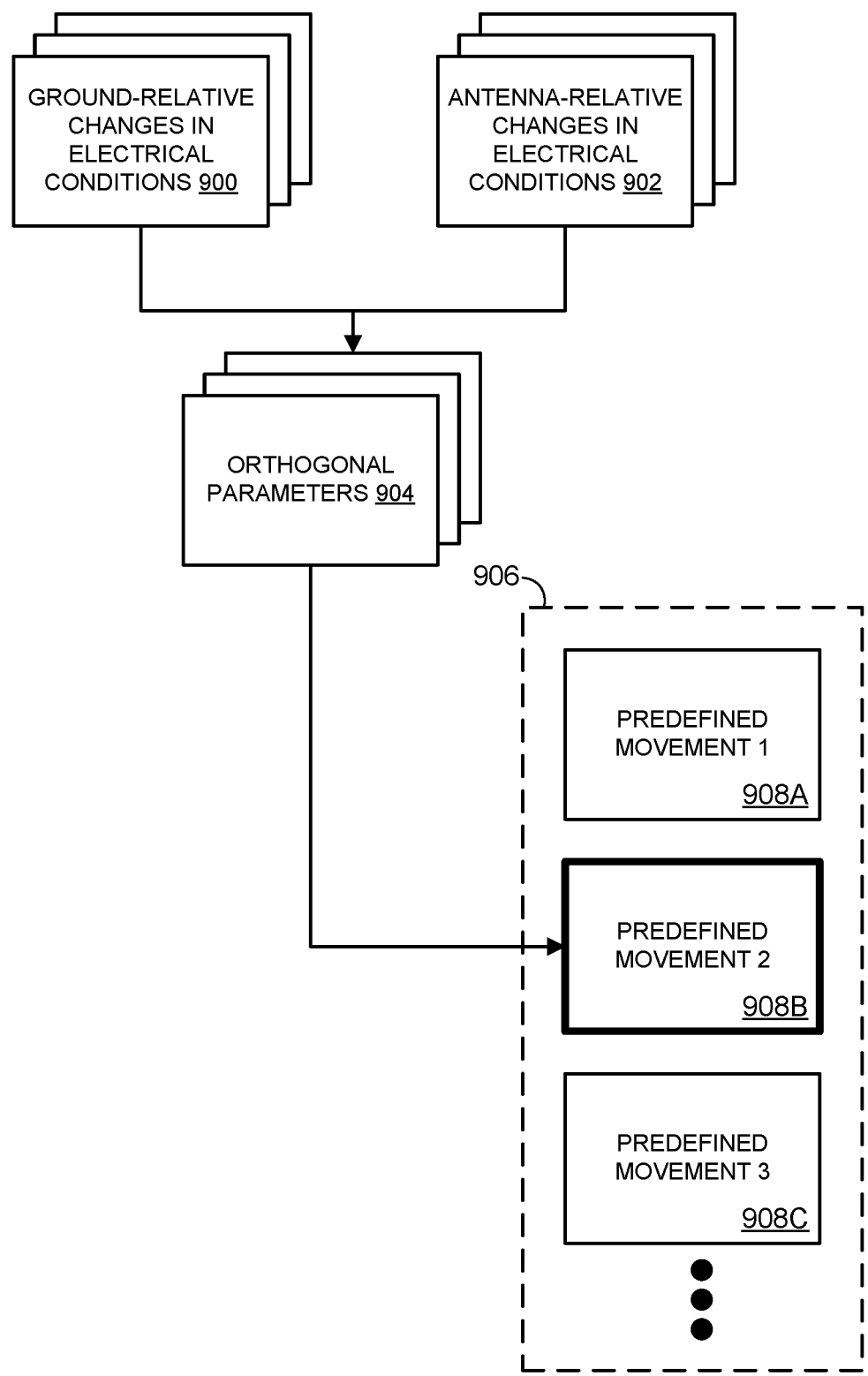
FIG. 9 schematically illustrates classifying a movement performed by a human user as one of a plurality of predefined human movements.

This may be done in any suitable way. FIG. 9 schematically illustrates classifying a human movement based on detected changes in electrical conditions. As shown, the computing device determines a plurality of ground-relative changes in electrical conditions 900, and a plurality of antenna-relative changes in electrical conditions 902, for any or all of a plurality of RF antennas exposing the body surface of the user to an E-field. Specifically, the computing device may then derive a plurality of orthogonal parameters 904 from the ground-relative changes in electrical conditions and the antenna-relative changes in electrical conditions. The movement performed by the human user may then be classified as a particular predefined movement 908B from among a plurality of predefined movements 906.

An "orthogonal parameter" as used above may take any suitable form. In general, an orthogonal parameter is any piece of information or data that can be derived from electrical conditions measured at one or more RF antennas, that is relevant to classifying a human movement. In some cases, the orthogonal parameters may simply take the form of voltage values measured at each RF antenna. In other examples, some amount of processing or aggregation may be done to derive orthogonal parameters from detected changes in electrical conditions. The term "orthogonal" indicates that the set of parameters cannot be derived from one another—e.g., the variables "A," "B," and "C" are orthogonal if none of the three variables can be computed through some series of operations applied to one or both of the other variables.

The specific manner in which the detected human movement is classified based on changes in electrical conditions may vary from one implementation to another—e.g., based at least in part on the specific movements or gestures that the computing device is intended to classify. As one non-limiting example, the computing device may maintain a set of predefined movements, where each predefined movement is associated with predefined orthogonal parameter values known to be consistent with that predefined movement. Thus, upon determining that a particular set of orthogonal parameters match a predefined set of parameters with at least a threshold similarity, then the detected human movement may be classified as the corresponding predefined movement.

For example, the observed set of orthogonal parameters may be used as values for a multi-dimensional feature vector, which may then be compared to similar vectors corresponding to each of the predefined movements via a suitable vector comparison process—e.g., by calculating a Euclidean distance. As another example, the detected movement may be classified as a predefined movement based at least in part on suitable machine learning (ML) and/or artificial intelligence (AI) techniques. For example, the computing device may include a machine learning trained-classifier configured to accept a set of orthogonal parameters as an input, and based on the parameters, classify the detected movement as one of a plurality of predefined movements. The machine learning-trained classifier may be trained in any suitable way and using any suitable training data—e.g., via a suitable combination of supervised and/or unsupervised learning.

The plurality of predefined human movements maintained by the computing device may include any suitable number and variety of different predefined movements. The plurality of different predefined movements maintained by the computing device may in some cases depend on the part of the human user that the computing device is configured to expose to the E-field. For example, the part of the human user positioned within the near-field region relative to the plurality of RF antennas may include a face of the human user, as discussed above, and therefore the movement performed by the human user may be classified as a recognized facial expression of a plurality of predefined facial expressions. Similarly, the part of the human user positioned within the near-field region relative to the plurality of RF antennas may include a hand of the human user, as discussed above, and therefore the movement performed by the human user may be classified as a recognized hand gesture of a plurality of predefined hand gestures.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 10:
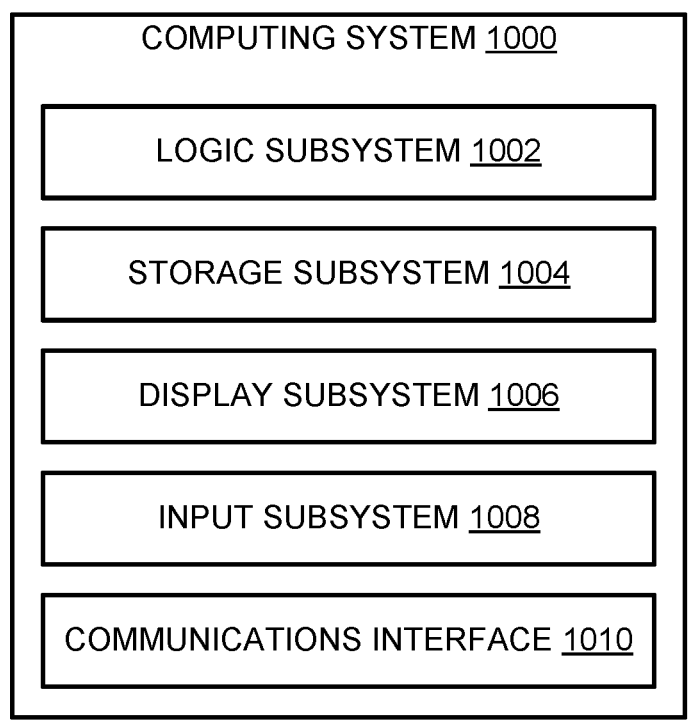
FIG. 10 schematically shows an example computing system.

FIG. 10 schematically shows a simplified representation of a computing system 1000 configured to provide any to all of the compute functionality described herein. Computing system 1000 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 1000 includes a logic subsystem 1002 and a storage subsystem 1004. Computing system 1000 may optionally include a display subsystem 1006, input subsystem 1008, communication subsystem 1010, and/or other subsystems not shown in FIG. 10.

Logic subsystem 1002 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 1004 includes one or more physical devices configured to temporarily and/or permanently hold computer information such as data and instructions executable by the logic subsystem. When the storage subsystem includes two or more devices, the devices may be collocated and/or remotely located. Storage subsystem 1004 may include volatile, nonvolatile, dynamic, static, read/write, read-only, random-access, sequential-access, location-addressable, file-addressable, and/or content-addressable devices. Storage subsystem 1004 may include removable and/or built-in devices. When the logic subsystem executes instructions, the state of storage subsystem 1004 may be transformed—e.g., to hold different data.

Aspects of logic subsystem 1002 and storage subsystem 1004 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 1006 may be used to present a visual representation of data held by storage subsystem 1004. This visual representation may take the form of a graphical user interface (GUI). Display subsystem 1006 may include one or more display devices utilizing virtually any type of technology. In some implementations, display subsystem may include one or more virtual-, augmented-, or mixed reality displays.

When included, input subsystem 1008 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 1010 may be configured to communicatively couple computing system 1000 with one or more other computing devices. Communication subsystem 1010 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method for human movement classification comprises: at a computing device, driving each of a plurality of RF (radio frequency) antennas to expose a body surface of a human user to an E-field, at least part of the human user positioned within a near-field region relative to the plurality of RF antennas; scanning each of the plurality of RF antennas to individually determine ground-relative changes in electrical conditions for each of the plurality of RF antennas relative to a previous time frame; selecting a differential-scanning subset of RF antennas from among the plurality of RF antennas, including two or more RF antennas for which the ground-relative changes in electrical conditions exceed a frame-to-frame threshold; for each RF antenna in the differential-scanning subset, determining a set of antenna-relative changes in electrical conditions by comparing the RF antenna to one or more other RF antennas in the differential-scanning subset as a plurality of pairs; and based at least in part on the ground-relative changes in electrical conditions and the antenna-relative changes in electrical conditions, classifying a movement performed by the human user as one of a plurality of predefined human movements. In this example or any other example, the part of the human user positioned within the near-field region includes a face of the human user, and the movement performed by the human user is classified as a recognized facial expression of a plurality of predefined facial expressions. In this example or any other example, the part of the human user positioned within the near-field region includes a hand of the human user, and the movement performed by the human user is classified as a recognized hand gesture of a plurality of predefined hand gestures. In this example or any other example, the method further comprises deriving a plurality of orthogonal parameters from the ground-relative changes in electrical conditions and the antenna-relative changes in electrical conditions, and the movement performed by the human user is classified based at least in part on the plurality of orthogonal parameters. In this example or any other example, the ground-relative changes in electrical conditions include detected changes in voltage at each of the plurality of RF antennas relative to an electrical ground of the computing device. In this example or any other example, for each of the RF antennas of the differential-scanning subset, the set of antenna-relative changes in electrical conditions for the RF antenna correspond to differences in detected voltage between the RF antenna and the one or more other RF antennas of the differential-scanning subset. In this example or any other example, a change in electrical conditions detected at a particular RF antenna of the plurality of RF antennas is caused by a change in a distance between the particular RF antenna and the human user while the body surface of the human user is exposed to the E-field. In this example or any other example, driving each of the plurality of RF antennas to expose the body surface of the human user to the E-field includes driving each of the plurality of RF antennas with drive signals having a same voltage and phase. In this example or any other example, determining a set of antenna-relative changes in electrical conditions for any pair of RF antennas in the differential-scanning subset includes driving a first RF antenna of the pair with a first drive signal, and driving a second RF antenna of the pair with a second drive signal having a same voltage as the first drive signal and having an opposite phase from the first drive signal. In this example or any other example, the one or more other RF antennas compared to any particular RF antenna in the differential-scanning subset for determining the set of antenna-relative changes in electrical conditions for the particular RF antenna exclude any RF antennas in the differential-scanning subset that are closer than a threshold distance to the particular RF antenna. In this example or any other example, one or more RF antennas of the plurality of RF antennas are associated with different antenna-specific frame-to-frame thresholds for inclusion in the differential-scanning subset. In this example or any other example, a framerate at which the plurality of RF antennas are scanned to determine ground-relative changes in electrical conditions is dynamically changed based on a number of RF antennas selected for inclusion in the differential-scanning subset on each of a plurality of time frames. In this example or any other example, the framerate is relatively lower when the number of RF antennas selected for inclusion in the differential-scanning subset is relatively higher. In this example or any other example, an RF antenna of the plurality of RF antennas comprises an RF resonator and an inductor. In this example or any other example, the inductor is a synthetic inductor comprising a plurality of operational amplifiers arranged in a cascaded topology. In this example or any other example, one or more of the plurality of RF antennas are communicatively coupled with an analog ASIC (application-specific integrated circuit) implemented via a BCD (bipolar-CMOS (complementary metal oxide semiconductor)-DMOS (double diffused metal oxide semiconductor)) process. In this example or any other example, the analog ASIC is communicatively coupled with a digital ASIC implemented via a CMOS process.

In an example, a computing device comprises: a logic subsystem; and a storage subsystem holding instructions executable by the logic subsystem to: drive each of a plurality of radio frequency (RF) antennas to expose a body surface of a human user to an E-field, at least part of the human user positioned within a near-field region relative to the plurality of RF antennas; scan each of the plurality of RF antennas to individually determine ground-relative changes in electrical conditions for each of the plurality of RF antennas relative to a previous time frame; select a differential-scanning subset of RF antennas from among the plurality of RF antennas, including two or more RF antennas for which the ground-relative changes in electrical conditions exceed a frame-to-frame threshold; for each RF antenna in the differential-scanning subset, determine a set of antenna-relative changes in electrical conditions by comparing the RF antenna to one or more other RF antennas in the differential-scanning subset as a plurality of pairs; and based at least in part on the ground-relative changes in electrical conditions and the antenna-relative changes in electrical conditions, classify a movement performed by the human user as one of a plurality of predefined human movements. In this example or any other example, the part of the human user positioned within the near-field region includes a face of the human user, and the movement performed by the human user is classified as a recognized facial expression of a plurality of predefined facial expressions.

In an example, a head-mounted display device (HMD) comprises: a near-eye display, a plurality of radio frequency (RF) antennas; a logic subsystem; and a storage subsystem holding instructions executable by the logic subsystem to: drive each of the plurality of RF antennas to emit electromagnetic (EM) radiation toward a face of a human user, at least part of the face of the human user positioned within a near-field region relative to the plurality of RF antennas; scan each of the plurality of RF antennas to individually determine ground-relative changes in electrical conditions for each of the plurality of RF antennas relative to a previous time frame; select a differential-scanning subset of RF antennas from among the plurality of RF antennas, including two or more RF antennas for which the ground-relative changes in electrical conditions exceed a frame-to-frame threshold; for each RF antenna in the differential-scanning subset, determine a set of antenna-relative changes in electrical conditions by comparing the RF antenna to one or more other RF antennas in the differential-scanning subset as a plurality of pairs; and based at least in part on the ground-relative changes in electrical conditions and the antenna-relative changes in electrical conditions, classify a current facial expression of the human user as a recognized facial expression of a plurality of predefined facial expressions.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for human movement classification, comprising:
    at a computing device, driving each of a plurality of RF (radio frequency) antennas to expose a body surface of a human user to an E-field, wherein at least part of a face of the human user is positioned within a near-field region relative to the plurality of RF antennas;
    scanning each of the plurality of RF antennas to individually determine ground-relative changes in electrical conditions for each of the plurality of RF antennas relative to a previous time frame;
    selecting a differential-scanning subset of RF antennas from among the plurality of RF antennas, including two or more RF antennas for which the ground-relative changes in electrical conditions exceed a frame-to-frame threshold;
    for each RF antenna in the differential-scanning subset, determining a set of antenna-relative changes in electrical conditions by comparing the RF antenna to one or more other RF antennas in the differential-scanning subset as a plurality of pairs; and
    based at least in part on the ground-relative changes in electrical conditions and the antenna-relative changes in electrical conditions, classifying a movement performed by the human user as a recognized facial expression of a plurality of predefined facial expressions.

2. The method of claim 1, further comprising deriving a plurality of orthogonal parameters from the ground-relative changes in electrical conditions and the antenna-relative changes in electrical conditions, and wherein the movement performed by the human user is classified based at least in part on the plurality of orthogonal parameters.

3. The method of claim 1, wherein the ground-relative changes in electrical conditions include detected changes in voltage at each of the plurality of RF antennas relative to an electrical ground of the computing device.

4. The method of claim 1, wherein for each of the RF antennas of the differential-scanning subset, the set of antenna-relative changes in electrical conditions for the RF antenna correspond to differences in detected voltage between the RF antenna and the one or more other RF antennas of the differential-scanning subset.

5. The method of claim 1, wherein a change in electrical conditions detected at a particular RF antenna of the plurality of RF antennas is caused by a change in a distance between the particular RF antenna and the human user while the body surface of the human user is exposed to the E-field.

6. The method of claim 1, wherein driving each of the plurality of RF antennas to expose the body surface of the human user to the E-field includes driving each of the plurality of RF antennas with drive signals having a same voltage and phase.

7. The method of claim 1, wherein determining a set of antenna-relative changes in electrical conditions for any pair of RF antennas in the differential-scanning subset includes driving a first RF antenna of the pair with a first drive signal, and driving a second RF antenna of the pair with a second drive signal having a same voltage as the first drive signal and having an opposite phase from the first drive signal.

8. The method of claim 1, wherein the one or more other RF antennas compared to any particular RF antenna in the differential-scanning subset for determining the set of antenna-relative changes in electrical conditions for the particular RF antenna exclude any RF antennas in the differential-scanning subset that are closer than a threshold distance to the particular RF antenna.

9. The method of claim 1, wherein one or more RF antennas of the plurality of RF antennas are associated with different antenna-specific frame-to-frame thresholds for inclusion in the differential-scanning subset.

10. The method of claim 1, wherein a framerate at which the plurality of RF antennas are scanned to determine ground-relative changes in electrical conditions is dynamically changed based on a number of RF antennas selected for inclusion in the differential-scanning subset on each of a plurality of time frames.

11. The method of claim 10, wherein the framerate is relatively lower when the number of RF antennas selected for inclusion in the differential-scanning subset is relatively higher.

12. The method of claim 1, wherein an RF antenna of the plurality of RF antennas comprises an RF resonator and an inductor.

13. The method of claim 12, wherein the inductor is a synthetic inductor comprising a plurality of operational amplifiers arranged in a cascaded topology.

14. The method of claim 1, wherein one or more of the plurality of RF antennas are communicatively coupled with an analog ASIC (application-specific integrated circuit) implemented via a BCD (bipolar-CMOS (complementary metal oxide semiconductor)-DMOS (double diffused metal oxide semiconductor)) process.

15. The method of claim 14, wherein the analog ASIC is communicatively coupled with a digital ASIC implemented via a CMOS process.

16. A computing device, comprising:
a logic subsystem; and
a storage subsystem holding instructions executable by the logic subsystem to:
  drive each of a plurality of radio frequency (RF) antennas to expose a body surface of a human user to an E-field, wherein at least part of a face of the human user is positioned within a near-field region relative to the plurality of RF antennas;
  scan each of the plurality of RF antennas to individually determine ground-relative changes in electrical conditions for each of the plurality of RF antennas relative to a previous time frame;
  select a differential-scanning subset of RF antennas from among the plurality of RF antennas, including two or more RF antennas for which the ground-relative changes in electrical conditions exceed a frame-to-frame threshold;
  for each RF antenna in the differential-scanning subset, determine a set of antenna-relative changes in electrical conditions by comparing the RF antenna to one or more other RF antennas in the differential-scanning subset as a plurality of pairs; and
  based at least in part on the ground-relative changes in electrical conditions and the antenna-relative changes in electrical conditions, classify a movement performed by the human user as a recognized facial expression of a plurality of predefined facial expressions.

17. A head-mounted display device (HMD), comprising:
a near-eye display;
a plurality of radio frequency (RF) antennas;
a logic subsystem; and
a storage subsystem holding instructions executable by the logic subsystem to:
  drive each of the plurality of RF antennas to emit electromagnetic (EM) radiation toward a face of a human user, at least part of the face of the human user positioned within a near-field region relative to the plurality of RF antennas;
  scan each of the plurality of RF antennas to individually determine ground-relative changes in electrical conditions for each of the plurality of RF antennas relative to a previous time frame;
  select a differential-scanning subset of RF antennas from among the plurality of RF antennas, including two or more RF antennas for which the ground-relative changes in electrical conditions exceed a frame-to-frame threshold;
  for each RF antenna in the differential-scanning subset, determine a set of antenna-relative changes in electrical conditions by comparing the RF antenna to one or more other RF antennas in the differential-scanning subset as a plurality of pairs; and
  based at least in part on the ground-relative changes in electrical conditions and the antenna-relative changes in electrical conditions, classify a current facial expression of the human user as a recognized facial expression of a plurality of predefined facial expressions.

* * * * *